Feb. 28, 1967 C. J. SMITH ETAL 3,306,394
MOBILE NOISE SUPPRESSOR FOR FAN-JET AIRCRAFT
Filed Nov. 3, 1965 5 Sheets-Sheet 1

INVENTORS.
CHARLES J. SMITH
ALVIN J. BRUNGARD
BY
Harry C. Burgess
ATTORNEY

United States Patent Office 3,306,394
Patented Feb. 28, 1967

3,306,394
MOBILE NOISE SUPPRESSOR FOR
FAN-JET AIRCRAFT
Charles J. Smith, Cincinnati, and Alvin J. Brungard, Greenhills, Ohio, assignors to General Electric Company, a corporation of New York
Filed Nov. 3, 1965, Ser. No. 506,452
14 Claims. (Cl. 181—51)

This invention relates generally to jet engine noise suppression apparatus. More specifically, the invention concerns improvements in such apparatus for non-airborne or ground use, including means particularly adapting the apparatus for use with turbofan type jet engines, and further means compensating for misalignment between the engine nacelle and the noise suppression apparatus.

Associated with the expansion of new and existing airport facilities and the advent of jet engine powered aircraft, both military and commercial, has been the problem of noise. While in-flight noise suppression or attenuation has received primary attention for obvious reasons, there has been for some time a demonstrated need for new and improved equipment for use on the ground. Thus, noise abatement devices are needed during the required periodic maintenance checks of engine and aircraft systems. Although several sound suppression and attenuation devices have been successfully produced, the recent widespread introduction of the turbofan or fan-jet engine has complicated the problem.

For a better understanding of the significance of the noise attenuation problems inherent in the fan-jet it should be explained that, whereas the well-known turbojet type gas turbine engine has a single main exhaust gas stream, the fan-jet has two such streams. That is, in addition to the extremely hot primary gas stream issuing from the center of the tailpipe, as a result of the increase in velocity of the air passing through the engine due to the compression and combustion processes, the fan-jet has another propulsive gas stream. The latter stream or jet is in the form of an annulus of fast moving air surrounding the primary gas stream. This secondary air is that which is compressed by the fan or low-pressure compressor of the fan-jet. The fan stream usually exits forward of the rear end of the engine nacelle. However, in the case of the rearwardly located fan, as contrasted to the so-called "front fan," the fan exhaust nozzle and the main jet or gas generator exhaust nozzle may be co-planar. In any event, there are two, rather than one, propulsive gas streams requiring the solution of a number of acoustic and aerodynamic problems for the general abatement of the noise attendant thereto.

In addition to complications in the purely sound area, the fan-jet poses something of a mechanical problem. Due to its increased diameter, i.e., the nacelle housing the low pressure compressor typically increases the diameter of the basic gas turbine by at least 50%, it is often more difficult to maneuver the noise attenuation apparatus into an operative position adjacent the rear of the engine nacelle. Such requirements as axial alignment of the engine and the suppressor become increasingly important—and difficult—with a fan-jet since the two airstreams must be directed into the suppression apparatus.

It is therefore a general object of the invention to provide improvements in a jet engine noise suppressor of the non-airborne variety whereby the suppressor is particularly adapted for use with turbofan or fan-jet engines.

A more specific object of the invention is to provide mobile jet engine noise suppression apparatus for ground use in connection with the maintenance or testing of turbofan engines, the apparatus being highly maneuverable and adjustable in both elevation and longitudinal attitude for ease of operational connection with an engine.

Another object of the invention is to provide a self-powered, self-contained, self-restraining, highly mobile jet engine ground run-up noise suppressor particularly adapted for use with installed turbofan type jet engines in a variety of aircraft wherein the nacelles or engine centerlines are not normally of the same height, nor completely parallel to the ground, or to each other in the case of multi-engine aircraft.

A disclosed embodiment of our invention comprises an elongated generally tubular open-ended body structure having located interiorly thereof sound absorbing noise diffusing and mixing means. In operation the body structure is positioned with one of its ends adjacent the tailpipe of the turbofan engine for capturing the primary or main gas generator exhaust jet by means of an improved, highly maneuverable and adjustable mobile support structure. The support structure of the invention includes, for example, means for raising or lowering the forward end of the body structure for adjusting the "pitch" of the longitudinal axis of same to compensate for any misalignment between the engine nacelle and the noise suppressor. Other means are incorporated in the support structure for adjustment of "yaw" of the body structure and for reacting the thrust of the engine exhaust gases imposed on the structure so as to make it self-restraining. A primary feature of the invention is the provision for an open-ended, axially extending duct member surrounding the body structure at its forward end. The duct member is supported on the body structure for relative axial movement with respect thereto so that in its forwardmost position it mates with the exhaust nozzle of the fan portion of the turbofan engine for capturing the secondary exhaust gas stream in order to direct same interiorly of the body structure for noise attenuation along with the primary gas stream.

The subject matter which we regard as our invention is particularly pointed out and distinctly claimed in the concluding portion of this specification. Our invention, both as to organization and operation, together with further objects and advantages thereof, may perhaps be best understood by reference to the following description taken in connection with the accompanying drawings in which:

Figure 1:
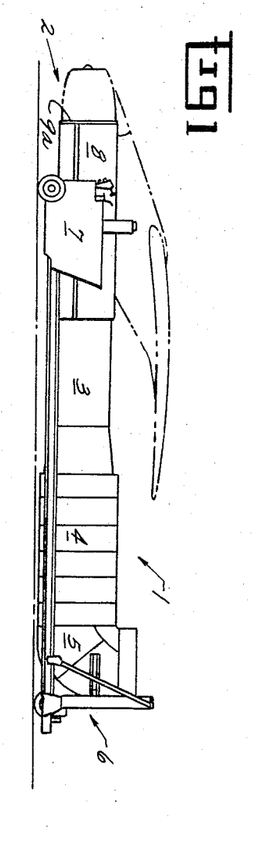
FIG. 1 is a side elevation of the apparatus of the invention positioned for operation with a wing-mounted turbofan type jet engine (the latter shown in dotted lines)

Turning now more specifically to the drawings, FIG. 1 illustrates the jet engine noise suppressor of the invention positioned for use with an installed aircraft jet engine of the turbofan variety. The noise suppressor indicated generally at 1 is positioned to the rear of and is operatively connected to the jet engine 2 shown in phantom in the drawing. The noise suppressor comprises a generally tubular body structure including a mixer-diffuser section, indicated generally at 3, connected to a generally rectangular section, indicated at 4, having an acoustical baffle arrangement located interiorly thereof. The primary and secondary jet exhaust gas streams of the turbofan engine 2 are captured by the noise suppressor and pass through the mixer-diffuser section, the acoustical baffle section, to be discharged into the atmosphere through the exhaust stack, indicated generally at 5.

In accordance with one feature of our invention, there is provided a highly maneuverable mobile support or carriage structure indicated generally at 6, including a power supply and tractor portion indicated at 7. Thus, in the embodiment shown, the noise suppressor apparatus is self-powered with the support structure or carriage having wheels and the power supply-tractor console including means for seating an operator for steering the apparatus over the ground and controlling operational adjustments of the apparatus, as more fully described hereinafter.

An important feature of our invention is the provision for adapter means enabling the jet engine noise suppressor apparatus to be particularly useful with fan-jet or turbofan type engines of the kind shown in the drawings. The disclosed fan-jet adapter comprises an open end duct member indicated generally at 8 in FIGS. 1 and 2. As shown in the drawings, with the noise suppressor apparatus in the FIG. 1 position, the primary or main gas generator exhaust stream will enter the suppressor through a primary orifice 9 visible in the end view of FIG. 2. The secondary or fan jet exhaust stream, on the other hand will be captured by the adapter means and will enter the forward open end of the duct member 8 indicated at 9a in the drawings. The secondary and primary streams will then be co-mingled in the mixer section 3 of the apparatus through use of a "daisy" type ejector indicated generally at 10 and depicted in FIGS. 3a and 3b. As indicated by the dotted arrow in FIG. 3b, the secondary or fan jet exhaust stream enters the "daisy" section through passages 11 for mixing with the hot main gas stream entering the orifice 9. For a more detailed explanation of a sound absorbent and noise diffusing and mixing section, including a "daisy" type ejector, attention is directed to the co-pending application of common assignment entitled, "Sound Suppressor," Serial No. 364,649, filed May 4, 1965.

Figures 2, 3A, 3B, 6:
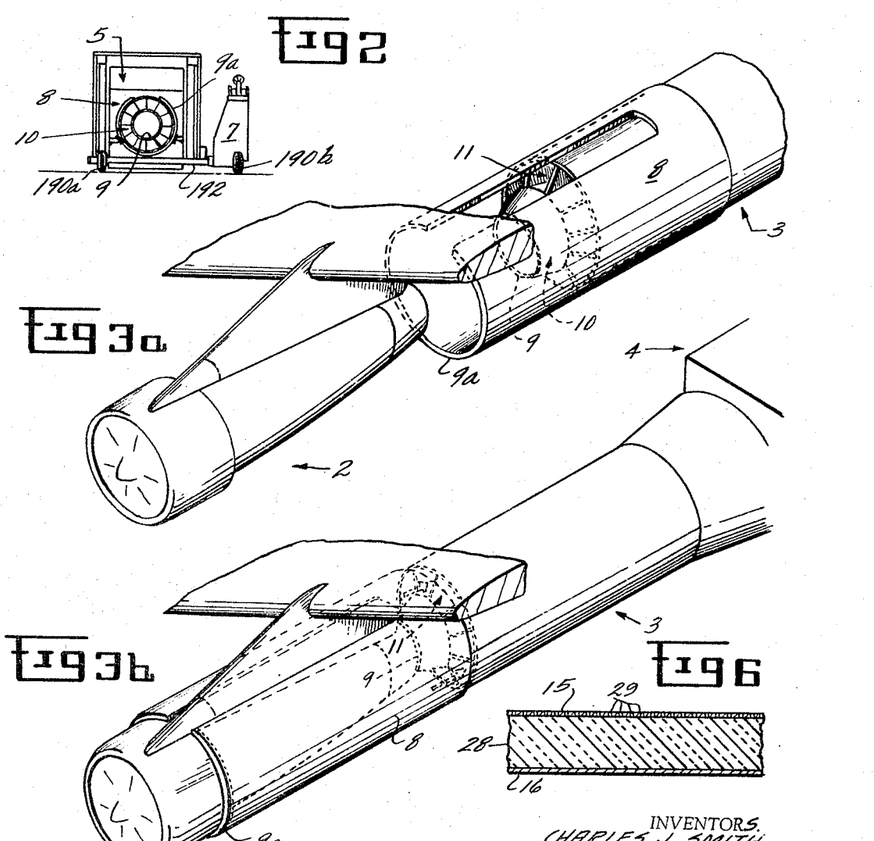
FIG. 2 is a front view of the apparatus of FIG. 1.
FIGS. 3a and 3b are perspective views, respectively, of the fan-jet adapter of the invention aligned with the fan-jet engine nacelle and located immediately rearwardly thereof, and then translated forwardly to mate with the fan exhaust nozzle of the engine, which as shown, is of the front-fan variety.
FIG. 6 is a cross-section of the adapter duct member illustrating the perforated inner wall and acoustic packing.
Figure 4:
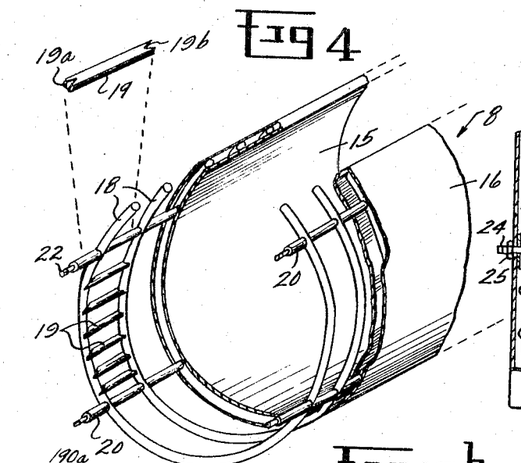
FIG. 4 is a perspective view partially cutaway and in cross-section illustrating the details of construction of the disclosed embodiment of the adapter duct member.
Figure 5:
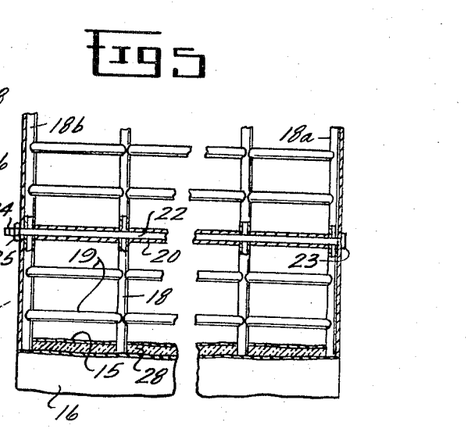
FIG. 5 is a simulated plan view of the cylindrical adapter duct member of FIG. 4 further illustrating typical construction details of same including means for rigidizing the duct member wall.

Referring now to a more detailed description of the disclosed embodiment of the adapter duct member structure 8, as seen in FIGS. 4 through 6, the adapter or duct member 8 comprises the inner and outer spaced walls 15 and 16, respectively. To add strength to the duct which, when located in its forwardmost position, as seen in FIG. 3b, is essentially cantilevered from the body structure, means are provided to rigidize the duct walls which may be constructed of relatively lightweight sheet metal. To this end a plurality of tubular members 18 are provided between the duct walls. The members are arranged parallel to each other and are axially-spaced over the length of the duct member. The tubular members are themselves supported in this arrangement by a plurality of spacer members 19 having V-notches 19a and 19b at either end thereof, for close engagement with the members 18. The spacers are also preferably constructed of lightweight hollow tubular pieces, although they may be solid. In any event, the spacers are also arranged in parallel rows—running axially of the duct—with a row between adjacent tubular members, as shown in FIG. 5. Spaced at intervals about the duct member circumference are a plurality of conduits 20. In the disclosed embodiment of the duct member 8 there are four of these conduits, each of which are hollow. The conduits intersect the tubular members 18, piercing the walls thereof to provide straight-through passages running the length of the duct member. To provide further strength to the duct member walls, telescoped within each of the conduit passages is a tension rod 22. Each rod extends slightly beyond the respective ends of the duct member and is adapted for tightening of the spacer-to-tubular member joints at the notches 19a and 19b for increased rigidity in the duct member, as shown in FIG. 5. It will be seen in the latter drawing that one end of each rod is provided with a capped portion 23 which projects beyond the last tubular member 18a at this same end of the duct member 8. The other end of each rod is flattened and threaded at 24 to receive a nut 25. The nut rides on the outside of the last tubular member 18b at the other end of the duct. When the nut means is tightened the structure comes into tension by reason of the drawing together of the framework comprising parallel tubular members 18 joined by the spacers 19. The duct member of the adapter 8 may be made more acoustically effective by means of a sound-absorbent packing 28 being provided between the duct walls in the open spaces formed by the aforementioned framework of spacers 19, members 18, and the hollow conduits 20. Further sound attenuation may be provided by means of perforations 29 in the inner wall 15 of the duct member 8, as best seen in FIG. 6. It will be understood that alternate types of construction for the adapter duct may be utilized as, for example, reinforced glass-fiber or honeycomb "sandwich" structure, as long as the duct walls are substantially self-supporting.

Figure 7:
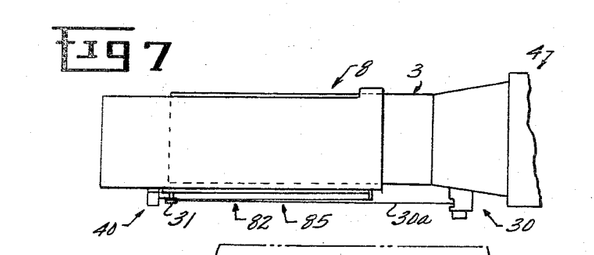
FIG. 7 is a partial schematic view taken along a horizontal plane illustrating one embodiment of motive means for axial translation of the fan-jet adapter duct member of the invention.

Thus, as will be seen in FIGS. 3a and 3b, if the duct member 8 is positioned at the nozzle of the fan portion of the turbofan engine 2 the exhaust air from the low pressure compressor fan—in this case, a front fan—will be ducted through the passage 11 and into the "daisy" mixer section. There, the fan gas stream is co-mingled with the primary stream entering the mixer at the orifice 9 and passing directly into the "daisy" ejector. The precise effect of the "daisy" mixer and noise suppression structure on the co-mingled hot and cold primary and secondary streams is more fully described in the aforementioned co-pending application of common assignment. Note that in the present invention, however, contrary to the usual pumping or sucking arrangement for getting the lower pressure or ambient air into the "daisy," secondary air from the fan is forced into the ejector. Thus, in our improved apparatus mixing is enhanced by the higher velocity of the fan air when compared to pumped air in the usual arrangement. It will be realized, therefore, that the above described feature of our invention comprises means for attenuating or suppressing the noise created by the secondary air stream heretofore not provided by any of the known sound suppression devices. The adapter duct member 8 is preferably manually slidable on the rollers due to its lightweight but sturdy construction. However, if desired powered means may be provided, one embodiment of which comprises a winch indicated generally at 30 in FIG. 7. The winch is supported from the mixer section 3 and drives a continuous cable 30a connected to the adapter 8 at 31. Suitable brake means (not shown) may be incorporated in the winch to retain the adapter duct member in any position other than fully retracted.

Figure 8:
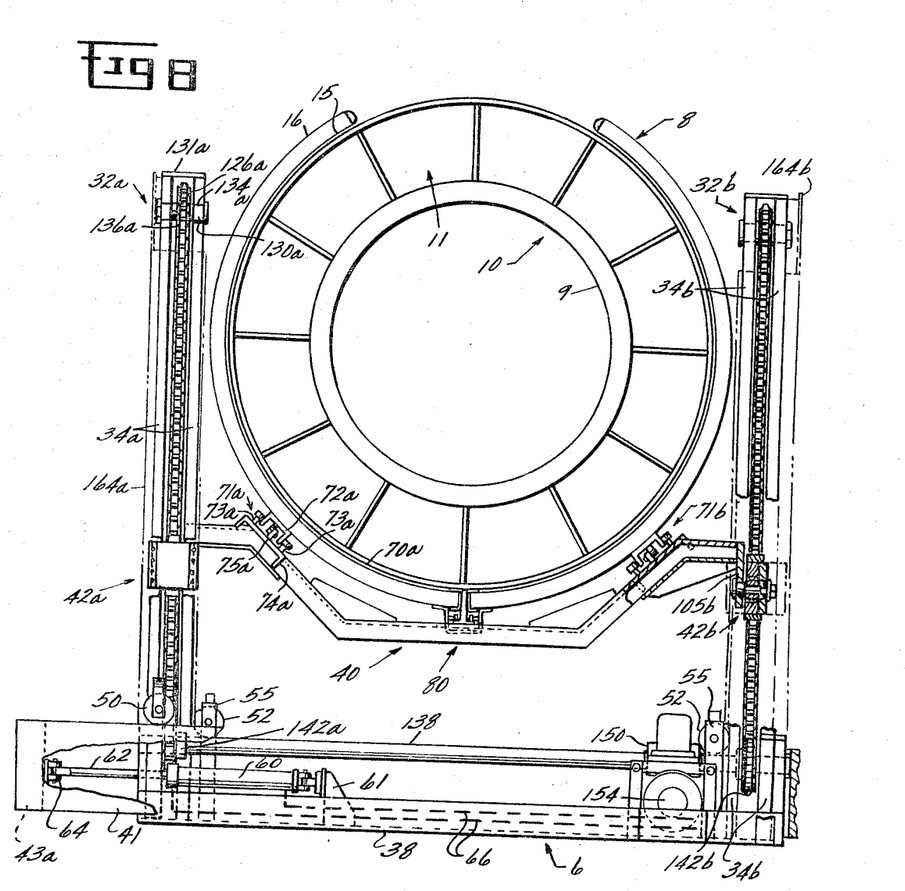
FIG. 8 is an enlarged front view of the apparatus of the invention partially cutaway and in cross-section illustrating an embodiment of the mechanism supporting the main body of the suppressor and the fan-jet adapter including means for adjusting "pitch" and "yaw" or directional attitude of the longitudinal axis of the suppressor body.

Turning now to FIG. 8, indicated therein is one embodiment of the main noise suppressor support structure. The drawing illustrates a preferred form of the mechanism for adjusting the attitude of the longitudinal axis of the main suppressor body portion for "pitch" and "yaw" together with the co-axially mounted adapter. The mechanism comprises a pair of upright support members, indicated generally at 32a and 32b, laterally spaced on the supporting structure 6 adjacent the front end thereof. The upright members each consist of a pair of spaced columns 34a–34a and 34b–34b, respectively, joined at the bottom ends thereof to a cross member 38 comprising a sheet metal box structure of suitably rigid construction. Extending between the columns and above the cross member is a lateral support member in the form of a yoke indicated generally at 40. The ends of the yoke 40, which in FIG. 8 will be located at the left and right side, respectively, of the support mechanism are each affixed to the support mechanism by connecting members in the form of supporting blocks, indicated generally at 42a and 42b, more fully described hereinafter.

Figure 12:
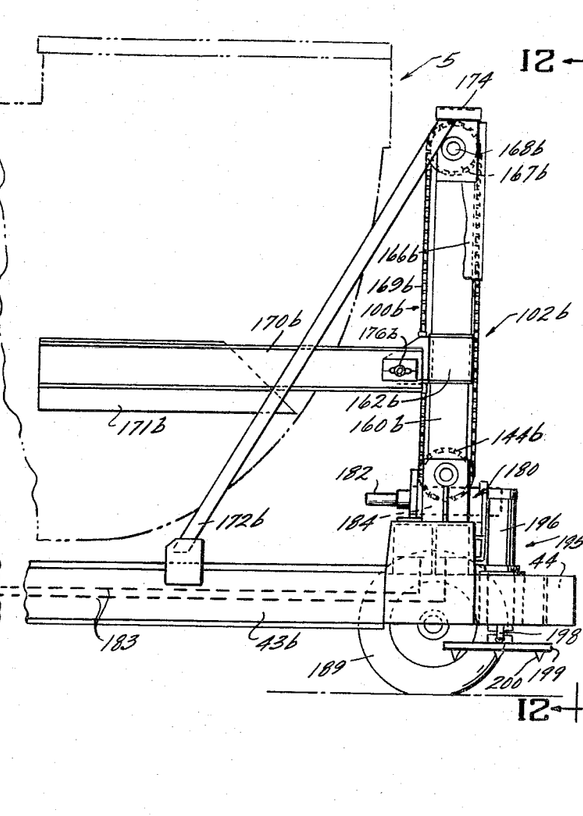
FIG. 12 is an enlarged rear view of the apparatus of FIG. 2.
Figure 13:
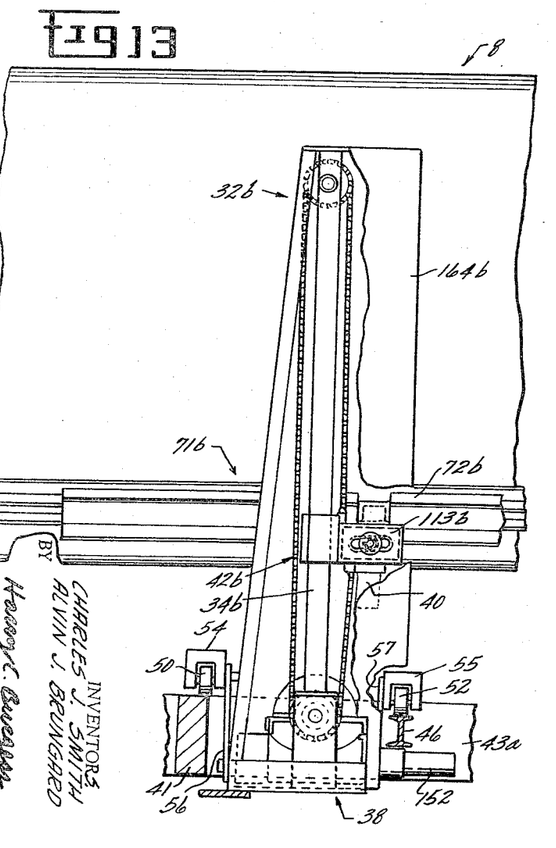
FIG. 13 is an enlarged side view partially cutaway and in cross-section of the front portion of the support structure including the pitch adjusting mechanism.
Figure 14:
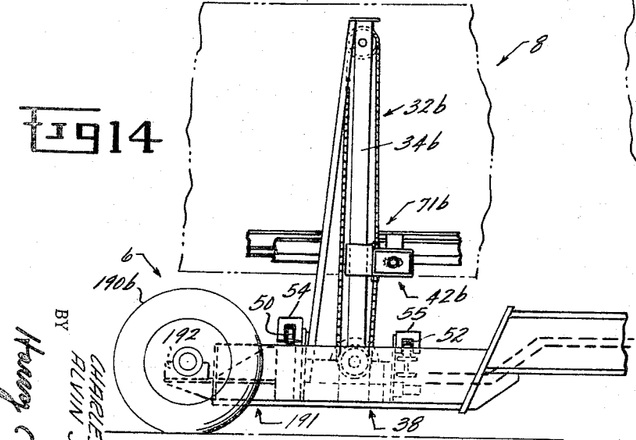
FIG. 14 is a side view, partially broken away and foreshortened to illustrate the overall noise suppressor carriage or supporting structure of the invention, including wheels for steering and driving same.

The main support or carriage structure 6 of the noise suppressor includes a front tie member 41. The tie member 41 joins a pair of side rails 43a–43b which in turn are joined at the rear of the structure by a similar tie member 44, as seen in FIG. 12, to complete the main suppressor carriage or support means. The tie member 41 is partially cutaway in FIG. 8 to better illustrate the mechanism for achieving lateral displacement of the integral column and frame member structures indicated at 32a, 32b and 38. The tie member 41 and an "I" beam 46, the latter being affixed to the side rails, as seen in FIGS. 13 and 14, support the frame 38 by movable support means including a first pair of rollers, one of which is shown at 50 in FIG. 8. Rollers 50 are arranged to ride on member 41. The I-beam, as seen best in FIG. 13, is located rearwardly of the front carriage tie member 41 and is utilized to support a second set of rollers 52. Blocks 54 and 55 are provided for the rollers 50 and 52, respectively, the blocks being supported from the frame 38 by connecting members 56 and 57, also respectively, for roller means 50 and 52. To move the frame, laterally suitable motor means are provided, which may take the form of a hydraulic actuator 60 rigidly attached by a bracket 61 to the frame member 38. The actuator rod 62 is pivotally connected at 64 to the side rail member 43a of the carriage or support structure 6. Upon actuation of the motor means 60, which may be supplied power from console 7 through power lines 66, the frame member 38 and integral columns 32a and 32b are translated back and forth, that is, to the left and to the right in the illustration of FIG. 8. As indicated in the schematic drawing of FIG. 15b, lateral movement of the front frame and columnar support mechanism will be effective to vary the directional attitude of the longitudinal centerline of the overall jet engine noise suppressor structure. The change in attitude may be likened to a change in "yaw" in aircraft parlance.

Figure 9:
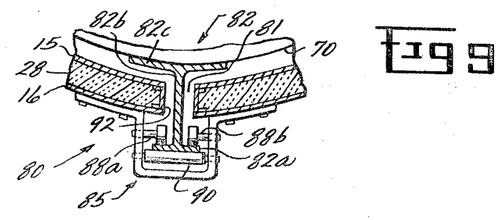
FIG. 9 is an enlarged view partially in cross-section of a segment of the adapter and the body portion illustrating the details of the center roller mount for the adapter duct member.

As described above, a primary feature of our invention is the provision of the adapter means 8 for capturing the secondary flow from the turbofan engine 2 for sound suppression thereof together with the primary hot gas stream. Means must therefore be provided to support the adapter duct member 8 for relative axial movement with respect to the body structure of the apparatus. As will be seen in FIG. 8, the duct inner wall 15 is slightly spaced from the outer surface 70 of the mixer section 3. The adapter is slidably supported both from the mixer section and from the support mechanism yoke member, indicated, indicated generally at 40, by the slidable support means now to be described. Indicated generally at 71a and 71b, are supports each of which include an elongated, axially extending channel 72 permanently affixed to outer wall 16 of the duct member 8. Since the structures 71a and 71b are identical only one support will be described. Thus, there is provided a channel 72a the sides of which locate a pair of roller assemblies 73a—73a. The rollers 73a—73a are themselves supported from a channel-shaped member 74a affixed to the yoke or laterally-extending member 40. The axially-extending channel member 72a in turn supports a centrally located roller assembly 75a. The duplicate rail and roller assemblies 71a and 71b thus provide laterally spaced relatively slidable duct support means running substantially the length of the adapter duct member 8. Further means are necessary, however, for support of the forward portion of the mixer section 3 which is the primary support point for the forward end of the main body structure. To this end there is provided, as indicated generally at 80 in FIGS. 8 and 9, a central body support and adapter roller assembly. This assembly is perhaps best shown in the enlarged, partially cutaway cross-sectional view of FIG. 9. Specifically, the latter drawing illustrates the elongated slot provided at 81 in the under portion of the adapter duct member 8. The slot receives an I-beam 82 running substantially the length of the duct and resting at the forward end on yoke 40. A U-shaped roller support bracket indicated generally at 85 is affixed to the adapter near the rear end thereof by being welded or otherwise permanently fastened thereto on the outer wall 16 thereof. Supported from the bracket 85 are a pair of guide or side mounted roller assemblies 88a and 88b. The bracket 85 also mounts a bottom support roller assembly 90. As will be seen in the drawings, the bottom roller assembly 90 spans the bottom portion 82a of the I-beam located at the end of the center portion 82b which extends through the slot. The upper surface of the bottom portion, in turn, supports the side or guide rollers 88a and 88b which permits movement of the adapter axially with respect to the mixer section to which the I-beam upper flange 82c attaches. A pair of end caps 92—92 may be provided to seal and rigidize the adapter member walls in the area of the slot.

Figures 10, 11:
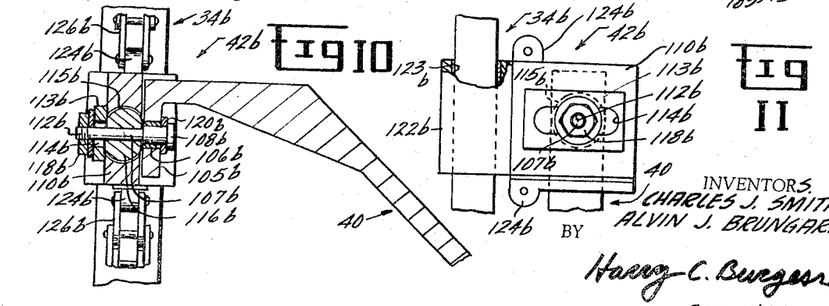
FIG. 10 is an enlarged end view partially in cross-section of the details of the adjustable connection between the duct member and the support mechanism.
FIG. 11 is a side view of the apparatus of FIG. 10.

In accordance with still another feature of our invention, means are provided whereby the up and down attitude or "pitch" of the longitudinal axis of the adapter means and body structure is varied depending upon whether there remains any misalignment of the suppressor and the turbofan engine nacelle centerline after any differences in "yaw" have been eliminated, as described above. To this end further adjustment means are therefore provided at the ends of the laterally-extending support member 40 where it joins the upright columns 32a and 32b at the forward end of the support structure 6. The adjustment means is preferably incorporated in the aforementioned connecting block means 42a and 42b. These angularly adjustable support means are shown in greater detail in FIGS. 10 through 12, FIG. 10 and 12 being enlarged views of one of the connecting block members 42b. While only one will be described in detail it will be understood that both connecting members, as well as both pairs of columns at the front and the rear of the suppressor support structure, respectively, are essentially the same. The description that follows is therefore equally applicable to the columns 100a and 100b at the rear of the structure 6 and their respective connecting blocks 102a and 102b, seen best in FIGS. 12 and 14. Turning now specifically to FIG. 10, the yoke 40 is either butt-welded to an end plate 105b, or the plate may be part of the yoke as shown. Plate 105b extends generally normal to the plane of the laterally-extending yoke and includes an opening 106b adapted to receive a pin 107b having a cap portion 108b at one end. The body of the pin extends through a connector block portion 110b and is threaded at its other end 112b. Located adjacent the other end of the pin 107b is a retainer plate 113b having an elongated slot 114b receiving the threaded end of the pin, the slot extending horizontally with respect to the connecting or supporting block assembly 42b. The connector block portion 110b has an enlarged cavity 115b adapted to retain a hollow ball member 116b. The ball member also is pierced by the pin 107b which, in turn, is secured in place by means of a nut 118b engaged with its threaded end and a plate washer 120b located between the end plate 105b and the pin cap portion 108b.

As will be seen from the drawings, the connector or supporting block assembly 42b includes a sleeve member 122b adapted to surround the upright members 34b—34b of the column 32b. Bushing means 123b may be provided to facilitate the relative sliding movement between the sleeve member and the column members. To cause relative movement between the sleeve and column members 34b—34b, drive means are provided within the columns and between the upright members thereof, the drive means being attached to the connector block by means of an adjustable roller 124b integral with the block portion 110b. In the disclosed embodiment the drive means for each column of the front pair of columns of the carriage 6 comprises endless chain 126a and 126b. As shown in detail in FIG. 8, each column has located at the upper end thereof a half-shaft, one of which is indicated at 130a in FIG. 8. The column is topped by a cap 131a and the half-shaft extends between the column uprights 34a—34a, being supported for rotation therein by suitable bearing means 134a. The chain itself is supported on a sprocket 136a affixed to the half-shaft. The arrangement at the bottom of each column is substantially same except that for each of the fore and aft pair of columns there are elongated drive-shafts 138 and 140, respectively. The drive-shafts extend laterally across the width of the carriage or support structure, as shown in FIGS. 8 and 12. Each drive-shaft is attached to and supports a pair of sprockets. Thus, for drive-shaft 138 there are sprockets 142a and 142b; likewise, sprockets 144a and 144b are affixed to drive-shaft 140 at the rear of the apparatus. In order to turn the front drive-shaft 138, which in turn will cause rotation of the chains 126a and 126b about their sprockets for raising or lowering the yoke 40, and thus the front end of the noise suppression apparatus, a gear box 150 is suitably engaged with teeth on the drive-shaft 138. The gear box is operated through motor means 152 which is supplied with power from the tractor-console 7. Thus, the support mechanism is operated by rotation of the drive shaft 138 to raise and lower the yoke 40 to the desired position. The desired elevation is then retained by means of a brake arrangement 154 integral with the gear box 150 and located adjacent the motor 152 and operable to prevent further rotation of the drive-shaft.

Figure 15A:
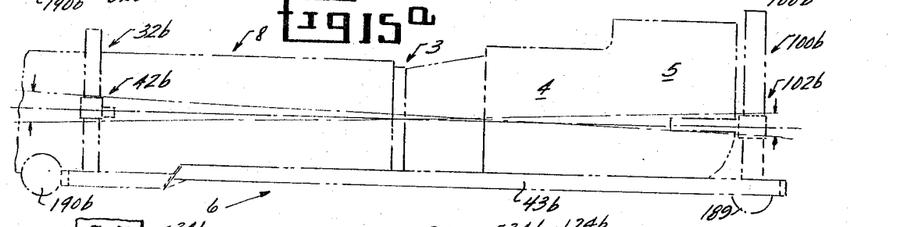
FIGS. 15a and 15b illustrate schematically the general range of relative adjustment of the directional attitude of the longitudinal axis of the generally tubular suppressor body and the coaxially arranged fan-jet adapter duct showing, generally, the adjustment of the suppressor body and adapter for "pitch" and "yaw," respectively, with use of the support mechanism of the invention.
Figure 15B:
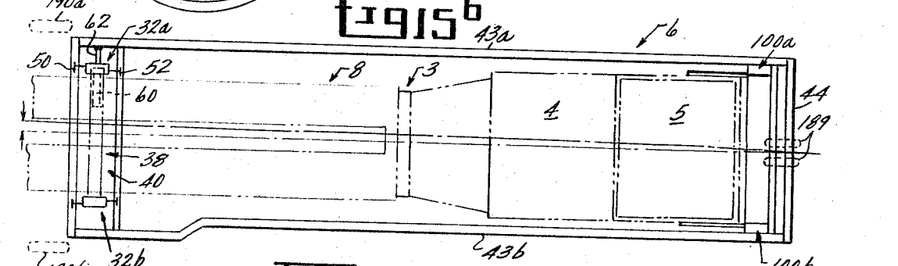

Thus, it will be seen that together with the arrangement for laterally moving the column-frame assembly 38, 32a–32b, utilizing the roller and track mechanisms described above, the support mechanism comprising the chain drive and adjustable connecting blocks herein just described provides a wide range of vertical up and down movement. It will be apparent that as the front end of the support mechanism moves laterally left or right, to adjust the "yaw" of the suppressor apparatus, some means are needed to permit the necessary angular displacement of the supporting or connector blocks 42a and 42b. The elongated slots 114a and 114b will permit such movement through means of the connector pins 107a and 107b providing the desired freedom from binding of the laterally-extending support member or yoke 40 at the upright pairs of support columns 32a and 32b. Angular up and down displacement likewise is provided by means of the ball joint assembly disclosed in detail in FIGS. 10 and 11. Therefore, substantially universal angular movement of the noise suppressor main body portion, including the coaxially arranged adapter duct 8, is provided as indicated in FIGS. 15a and 15b. Since it is obviously necessary to provide some degree of angular freedom of movement at the rear end of the suppressor means, duplicate adjustable support means are needed there. To this end, the aforementioned pair of upright laterally spaced support columns 100a and 100b, including column members 160a and 160b, are encircled by sleeves 162a and 162b on the connecting blocks indicated generally at 102a and 102b. As the rear connector blocks function in substantially the same manner as the front blocks 42a and 42b previously described in detail and shown in FIGS. 10 and 11, they will not be discussed further. If desired each of the columns 32a–32b and 100a–100b may be partially enclosed by means of covers 164a–164b and 166a–166b, respectively, to prevent fouling of the chain drive means. Thus, as seen in FIG. 12 the rear covers enclose upper sprocket means 167a and 167b mounted on half-shafts 168a and 168b. Chains 169a and 169b are supported on the half-shaft sprockets and sprockets 144a and 144b for connection to blocks 102a and 102b, respectively, in the manner described above. The blocks in turn are pivotally connected to laterally-extending supports 170a and 170b attached to plates 171a and 171b affixed to the exhaust section 5 of the body. The upright columns at the rear of the noise suppressor may also be suitably braced by rigid rods 172a and 172b extending at an angle from the top of the columns to the side rails 43a and 43b. Rear braces 173 and 171 may also be provided if desired for connection with a top brace 174 for further support of the rear columns. Thus, the arrangement at the rear columns for connecting lateral support members 170a and 170b is not significantly different from that utilized at the forward pair of columns. In other words, the connecting blocks 102a and 102b including the sleeves and adjustable means 176a and 176b provide universal angular adjustment at the connection between the lateral support member and the upright supporting columns. The adjustable connectors 176a and 176b connect the drive chains 169a and 169b to the supporting blocks. As in the case of the drive arrangement at the front of the carriage, the rear drive shaft 140 is connected to a gear box indicated at 180. A motor 182 supplied with power from the console 7 through power lines 183 includes a brake 184 utilized in conjunction with the motor and the gear box for maintaining the aft end of the noise suppressor body structure at the correct elevation, as the supporting blocks 102a and 102b are moved up and down on the columns 100a and 100b.

As explained above it is highly desirable that the noise suppressor apparatus be mobile and easily maneuverable for positioning rearwardly of the turbofan engine. For this reason the noise suppressor apparatus of the disclosed embodiment of our invention includes steering and driving wheel means, as best shown in FIGS. 12 and 14. Thus, there is provided a power steering unit indicated at 186, which may be powered by the motor 182, adapted to drive a steering shaft 187. A pinion (not shown) is suitably geared to a shaft 188 which supports a pair of steering wheels 189—189 mounted in tandem at the rear of the carriage or support apparatus 6. At the forward end of the apparatus are located a pair of driving wheels, indicated generally at 190a and 190b. The driving wheels are supported on the carriage by means of a support frame or box member indicated generally at 191. The driving wheel support frame is preferably mounted on and supported from the front tie member 41 of the carriage or the main support structure. Attached to the support frame 191 is a torque tube 192 which provides the driving force to the wheels 190a and 190b mounted therein. The drive wheels are supplied with power through the torque tube which is drivingly connected to a power supplying mechanism housed in the tractor-power console 7. Mechanical braking for the drive wheels can be utilized when the suppressor is in use. It is usually desirable to provide means to firmly anchor the sound suppressor apparatus when it is positioned adjacent the rear of the wing mounted engine, as shown in FIG. 1. It is even more desirable to provide means whereby the need for additional or extraneous tie-down structure is unnecessary. To this end ground contact means are provided, as indicated in FIG. 12, which may comprise a plurality of stabilizing mechanisms, one of which is indicated at 195. The stabilizer and thrust restraining device 195 includes a body portion 196 having a power cylinder 197 telescoped therein. At the lower end of the power cylinder there is a universal joint 198 pivotally connected to a ground plate 199. The ground plate is generally rectangular or square in form, is of substantial thickness and may include a plurality of heavy triangular spikes 200 protruding from the underside, but in any event, means are provided to insure an adequate co-efficient of friction at the point of contact with the surface on which the apparatus is resting. Upon actuation of the hydraulic ram body portion, through suitable control means from the console 7, the cylinder 197 will be extended downwardly to the point at which the spikes 200 contact the ground. The cylinder stroke will continue until the steering wheels are effectively raised off the ground. Obviously, the power cylinders may be relatively adjusted vertically to compensate for any unevenness of the ground.

It will be noted from the drawing of FIG. 14 that the exhaust stack section turns the exhaust gases through a 90° angle. Visualizing the curved section 5 as the equivalent of a flat plate, the face of the plate extends effectively at a 45° angle from the horizontal. By proper arrangement of the hydraulic stabilizers essentially in a fore and aft alignment with the lateral support members 171 and particularly, with the outer of the joints 162, the resultant forces are the exhaust gas stream imposed on the suppressor apparatus can be effectively utilized to make the device self-restraining. That is, with the disclosed embodiment, except for the slight discrepancy occasioned by the small moment arm between the axis of cylinder 196 and the longitudinal axis of upright 160, approximately one-half of the total force (T) of the engine thrust passes directly through the joint 198, as seen in FIG. 14, only the remaining one-half of the thrust force (T) is left, therefore, to act rearwardly or against the self-restraining vertical holding force.

While particular embodiments of the means and method of the present invention have been disclosed, it will be obvious to those skilled in the art that various changes and modifications may be made in the embodiments thereof without departing from the spirit or scope of the invention, and it is therefore intended in the appended claims to cover all such equivalent variations and modifications.

What we claim and desire to secure by Letters Patent is:

1. Jet engine noise suppressor apparatus comprising:
   an elongated, generally tubular body member open at both ends, said body member having sound absorbent means located interiorly thereof;
   a mobile support structure for said body member, whereby said body member can be positioned with one of its ends adjacent the tailpipe of a turbofan engine for capturing the primary exhaust gas stream thereof; and
   means including an open-ended, axially-extending duct member surrounding said body member adjacent said one end thereof and substantially co-axial therewith, said duct member being supported from said body member for relative axial movement with respect thereto, wherein in its forwardmost position said duct member is effective to capture the secondary exhaust gas stream of the fan portion of the turbofan engine and direct same into said body member for co-mingling with said primary gas stream.

2. The apparatus according to claim 1 wherein said mobile support structure includes:
   a wheeled carriage substantially axially coextensive with said tubular body member;
   power supply means integral with said carriage; and
   means on said carriage operable by said power supply means for providing angular adjustment of the longitudinal axis of said body member with respect to said carriage axis, whereby misalignment of said longitudinal axis and the axis of the turbofan is substantially eliminated.

3. The apparatus according to claim 2 wherein said angular adjustment means comprises:
   a pair of laterally-spaced vertical columns located at each of the forward and aft ends, respectively, of said carriage;
   a supporting block at each column of said pairs, said block being retained thereat for relative vertical movement along its respective column;
   a drive mechanism supported by each column, each of said drive mechanisms being operably connected to respective ones of said blocks;
   support members extending laterally of each column of said pairs, said support members being affixed to said body member;
   means joining said support members to respective ones of said supporting blocks and permitting relative motion therebetween; and
   motor means operable by said power supply means to actuate said drive mechanisms for selective relative vertical movement of said supporting blocks at respective ones of said fore and aft pairs of columns for adjusting the pitch of the longitudinal axis of said body member with respect to the carriage axis.

4. The apparatus according to claim 3 wherein said drive mechanisms comprise:
   a continuous chain within each column;
   sprocket means at the upper and lower ends of each column and engaging said chains;
   half-shafts at the upper end of each column rotatably supporting the sprocket means thereat; and
   a pair of elongated drive-shafts, one drive-shaft of said pair extending laterally the width of said carriage between each column of said pairs of columns at either end of said carriage, said motor means being drivingly connected to said drive-shafts for selective operation thereof.

5. The apparatus according to claim 3 wherein said angular adjustment means includes:
   a generally rectangular hollow sleeve member integral with each of said supporting blocks and enclosing its respective column;
   bushing means spacing the walls of said sleeve member from said column for said relative vertical movement therealong, and, further, wherein each of said means joining said supporting blocks to their respective lateral support members includes, a support pin having an elongated body portion and a cap portion at one end thereof, said body portion extending through an opening in said lateral support member and being restrained therein by said cap portion;

a pair of aligned slots in opposing lateral walls of said blocks, said slots having their longitudinal axes parallel to the carriage axis, said pin body portion extending through and being movable along said slots;

hollow ball-joint means located within said block, said pin body portion extending through said ball-joint means, said ball-joint means rotatably supporting said pin with respect to said block;

a fastener securely engaged with the other end of said pin exteriorly of said block and securing said block to its respective support member, and an adjustable connector affixed to said block and to said drive mechanism for adjusting tension therebetween.

6. The apparatus according to claim 3 wherein said angular adjustment means includes:

a frame member extending laterally of said carriage at the forward end thereof, said frame member carrying said forward pair of laterally-spaced columns thereon;

roller means affixed to said frame member, said roller means being supported on said carriage; and further motor means operable by said power supply means and connected to said frame member for movement of said frame member substantially normal with respect to the longitudinal axis of said carriage for adjustment of the yaw of the longitudinal axis of said body member with respect to the axis of said carriage.

7. A turbofan engine exhaust jet noise suppressor comprising:

generally tubular means for receiving the primary exhaust gas stream of said turbofan engine and ducting same to the atmosphere;

means supporting said generally tubular receiving means, said supporting means being mobile for connection of said suppressor to said engine while said engine is stationary; and adapter means supported from said receiving means for relative axial movement therealong, said adapter means being translatable from an inoperative rearward position with respect to said supporting means to an operative position forward of said supporting means for capturing of the secondary fan exhaust gas stream of said engine and directing same into said receiving means for noise abatement thereof along with said primary exhaust gas stream.

8. In a non-airborne jet engine noise suppressor including an elongated generally tubular open-ended body member having sound absorbent means located interiorly thereof, and mobile support means for removably connecting one end of said body member to the primary exhaust gas stream opening of a jet engine nacelle, the improvement of means adapting said noise suppressor for use with a turbofan engine, said means comprising:

an elongated, open-ended, substantially cylindrical duct member;

means for supporting said duct member about said body member in spaced generally coaxial relationship therewith, said supporting means including a plurality of spaced roller members affixed to the exterior of said duct member for engagement with the mobile support means for relative axial movement of the duct member with respect thereto; and means affixed to said duct member and operable to translate same axially with respect to the body member, said duct member in its forwardmost position having one end thereof extending substantially beyond a respective end of the body member, whereby said duct member is removably connected to the fan opening of the turbofan engine nacelle for directing the secondary exhaust gas stream exiting therefrom into said body member for noise abatement of said secondary exhaust gas stream along with said primary gas stream.

9. The adapter means according to claim 8 wherein said duct member comprises:

a plurality of circumferentially extending tubes arranged axially of said member in a spaced, parallel relationship;

a plurality of longitudinally-extending hollow conduit members spaced around the circumference of said member, said hollow members intersecting said parallel arranged circumferential tubes and providing a plurality of bores extending axially of the length of said duct member;

spacer means extending between adjacent ones of said tubes and parallel to said hollow members;

a rod received in each of said bores, the respective ends of each rod extending just beyond the circumferential tube at each end of said member;

means retaining one end of each rod at one end of said member;

tensioning means at the other end of each rod and threadedly engaged therewith, whereby said tubes and said spacer means are constrained in a rigid framework on tightening of said tensioning means; and inner and outer wall means enclosing said framework, said wall means being permanently fastened to said framework in tension.

10. The duct member according to claim 9 wherein the open spaces in said framework enclosed by said inner and outer wall means is filled with a sound absorbent material, and further, wherein at least said inner wall means is perforated.

11. A non-airborne turbofan engine exhaust jet noise suppressor apparatus comprising:

generally tubular means for receiving the primary exhaust gas stream of said turbofan engine and ducting same to the atmosphere;

means supporting said generally tubular receiving means, said supporting means being mobile for connection of said suppressor to said engine while said engine is stationary;

adapter means supported from said receiving means for relative axial movement therealong, said adapter means being translatable from an inoperative rearward position with respect to said supporting means to an operative position forward of said supporting means for capturing of the secondary fan exhaust gas stream of said engine and directing same into said receiving means for noise abatement thereof along with said primary exhaust gas stream; and adjustable means integral with said mobile supporting means for angular adjustment of the directional attitude of the longitudinal axes of said generally tubular receiving means and said adapter means for elimination of misalignment of said longitudinal axes and the axis of said engine.

12. The apparatus according to claim 11 wherein said adjustable means includes a pair of vertical columns at either end of said mobile supporting means, laterally-extending support members pivotally connecting said receiving means to said columns, and drive means integral with each column of said pairs of columns and operatively connected to said support members for selective raising and lowering of said receiving means at either end of said supporting means for adjustment of the pitch of the axes of said generally tubular receiving means and said adapter means.

13. The apparatus according to claim 12 wherein said adjustable means includes a frame member carrying a pair of columns at one end of said mobile supporting means, and a plurality of roller means supporting said frame member for lateral movement thereof with respect to the longitudinal axis of said supporting means for adjustment of the yaw of the axes of said generally tubular receiving means and said adapter means.

14. The apparatus according to claim 11 wherein said supporting means includes a wheeled carriage and power supply means, said power supply means being operative to propel said carriage over the surface of the ground for removably connecting said suppressor apparatus to said engine, said power supply means being operably connected to said adjustable means for said adjustment of the directional attitude of the longitudinal axes of said receiving means and said adapter means.

References Cited by the Examiner

UNITED STATES PATENTS

| | | | |
|---|---|---|---|
| 2,974,744 | 3/1961 | Wade | 181—33 |
| 3,174,581 | 3/1965 | Duthion et al. | 181—33 |

FOREIGN PATENTS

| | | |
|---|---|---|
| 1,141,009 | 3/1957 | France. |
| 602,859 | 6/1948 | Great Britain. |

OTHER REFERENCES

Noise Control, vol. 2, No. 1, January 1956, pp. 10–14 and 65 (181—33).

RICHARD B. WILKINSON, *Primary Examiner.*

R. S. WARD, *Assistant Examiner.*